UNITED STATES PATENT OFFICE.

WILLIAM GRAHAM, OF UTAH COUNTY, AND EMERY WARD, OF SALT LAKE COUNTY, UTAH TERRITORY.

IMPROVEMENT IN BLASTING-POWDER.

Specification forming part of Letters Patent No. 201,520, dated March 19, 1878; application filed November 13, 1877.

*To all whom it may concern:*

Be it known that we, WILLIAM GRAHAM, of Utah county, Utah Territory, and EMERY WARD, of Salt Lake county, in the same Territory, have invented a new and useful Compound, which compound is fully described in the following specification.

This invention relates to that class of compounds used to blast rock and other material; and it consists of a composition formed by mixing yellow prussiate of potash, chlorate of potash, white sugar, and red lead together.

To prepare this composition, take sixteen (16) ounces of yellow prussiate of potash, forty (40) ounces of chlorate of potash, twenty (20) ounces of white sugar, and one and one-quarter (1¼) ounce of red lead.

Each of the above-named ingredients must be pulverized separately before mixing; then add to either of the potash salts the red lead, and mix well together; then add to this mixture the other potash salt and the white sugar, and combine the whole well together by rubbing or mixing, when the composition is made and ready for use.

We are aware that a composition has been introduced into Europe—said to have been invented by M. Augendre—which contains the three first-named ingredients of our composition; and we do not claim as our invention the combination of those three ingredients for blasting purposes.

The composition of Augendre referred to has not come into use for purposes of blasting, owing to serious defects, among which are the danger arising from its manufacture, its too rapid explosion in the process of blasting, the excessive heat produced, and consequent injury to the vessels containing it, and the oxidation of said vessels or receptacles.

We propose, by the addition of the ingredient of red lead, to obviate these defects. By mixing the red lead, in the first instance, with one of the potash salts before introducing the other potash salt, we prevent the danger of a premature explosion during the process of manufacture, which is one of the disadvantages of the Augendre compound, in which the salts are brought together without the intervention of any substance of similar character to the one we propose to use. The introduction of the red lead, also, by diminishing the granulated character of the compound and intervening between the salts, prevents the too rapid explosion of the composition during the process of blasting—a great desideratum in blasting for mining purposes. The red lead, we believe, prevents also the oxidation of the metal receptacles used to contain the composition. In addition to this, the composition with the ingredient of red lead added, can be used effectively when wet and of the consistency of dough, which is not true of or claimed for the foreign invention.

The explosion of our composition is unaccompanied by noxious or foul odors or vapors—a matter of great importance when blasting in mines, and which we believe and claim to be owing to the introduction of red lead into the composition.

We claim as our invention—

A compound consisting of the yellow prussiate of potash, chlorate of potash, white sugar, and red lead, prepared in the manner, and in the proportions, and for the purposes substantially as specified.

WM. GRAHAM.
E. WARD.

Witnesses:
JAMES S. ROBINSON,
C. D. BRADLEY.